Patented Mar. 27, 1945

2,372,176

UNITED STATES PATENT OFFICE 2,372,176

SOLVENT SEPARATION OF UNSATURATED HYDROCARBON MIXTURES

Charles A. Coghlan, Beacon, N. Y., and Karl J. Korpi, Pasadena, Calif., assignors to The Texas Company, New York, N. Y., a corporation of Delaware No Drawing. Application March 3, 1944, Serial No. 524,956

4 Claims. (Cl. 260—677)

This invention relates to the solvent separation of hydrocarbon mixtures by extraction with a solvent comprising triethanol amine.

The invention has to do with a continuous process of separating butylene-2 from hydrocarbon mixtures containing it and other olefin hydrocarbons by solvent separation with triethanol amine, particularly at temperatures in the range about 140 to 200° F.

The selectivity of triethanol amine and two other solvents, as between butylene-2 and isobutylene for example, is shown by the following data:

| Temperature °F | 100 | 120 | 140 | 150 | 180 | 200 | 220 | 240 |
|---|---|---|---|---|---|---|---|---|
| Solubility ratios: | | | | | | | | |
| 1-triethanol amine | 1.27 | 1.43 | 1.71 | 1.79 | 1.88 | 1.97 | 1.66 | 1.51 |
| 2-monoethanol amine | 1.10 | 1.18 | 1.20 | 1.25 | 1.18 | 1.13 | 1.12 | 1.12 |
| 3-diethylene glycol | 1.03 | 1.01 | 1.01 | 1.03 | 1.05 | 1.06 | 1.05 | 1.08 |

The solubility ratio is the ratio of cubic centimeters of liquid butylene-2 soluble in 100 cubic centimeters of the solvent to the cubic centimeters of liquid isobutylene soluble in 100 cubic centimeters of the same solvent at each temperature.

As indicated by the foregoing data, the solubility ratio of butylene-2 to isobutylene in 100 cubic centimeters of triethanol amine ranges from 1.27 at 100° F. to an optimum in the range 180 to 200° F. and thereafter decreases, being about 1.51 at a temperature of 240°. It is significant that within the temperature range of 140 to 200° F. the solubility ratio is uniformly high ranging from 1.71 to 1.97. Both below 140° F. and above 200° F. the solubility ratio for triethanol amine drops off unexpectedly.

For purposes of comparison the solubility ratio is shown for other solvents, namely, monoethanol amine and diethylene glycol. In the case of these other solvents there is very little variation in the solubility ratio at temperatures ranging from 100 to 240° F.

From the foregoing it is apparent that triethanol amine exerts substantial selective action as between isobutylene and butylene-2 at temperatures in the range 140 to 200° F., which is in contrast with the other solvents referred to.

The invention is applicable to the separation of butylene-2 from C₄ olefin-paraffin mixtures containing butylene-2 in substantial amount. Such mixtures may be obtained by the dehydrogenation treatment of C₄ hydrocarbons obtained from different sources and advantageously those obtained in the catalytic cracking of hydrocarbons to produce gasoline. Extraction of butylene-2 from an olefin-paraffin mixture containing it may be effected by subjecting the olefin-paraffin mixture to contact with the solvent of this invention in stage or continuous countercurrent flow. According to one method of operation the extraction may be effected in a packed tower through which the solvent and feed hydrocarbon mixture flow countercurrently. The feed hydrocarbons may be introduced to the reaction tower in either the gas or liquid phase.

It is also contemplated that the solvent may be used in extractive distillation operations wherein the hydrocarbon mixture is subjected to fractional distillation in the presence of the solvent to thereby extract butylene-2 from a gaseous olefin-paraffin mixture.

In employing an extraction tower the feed hydrocarbon mixture is advantageously introduced to the tower at an intermediate point while the solvent liquid is introduced to the upper portion of the tower. As a result of the contact between the hydrocarbons and the solvent liquid, extract and raffinate phases are formed. The raffinate phase rises to the upper portion of the tower and is continuously withdrawn therefrom while the extract phase descends toward the bottom of the tower from which it is continuously withdrawn. A portion of the withdrawn extract phase after removal of the solvent is advantageously recycled to the lower portion of the extraction tower at a point substantially below the point of feed hydrocarbon introduction. By recycling extract in this manner the section of the tower below the point of feed hydrocarbon introduction operates as a rectiflow section, permitting the production of an ultimate extract of high butylene-2 content.

The butylene-2 so separated from the feed hydrocarbon mixture may amount to from 70 to about 95% by volume of the total butylene-2 content of the charge, depending upon the ratio of solvent to feed hydrocarbon mixture, extraction temperature, and proportion of extract recycle employed. The purity of the butylene-2 extract so obtained may vary from 70 to 98% or more, depending upon the foregoing conditions of operation employed.

For example, a feed hydrocarbon mixture containing 43% isobutylene, 50% butylene-2, 4% isobutane, and about 3% normal butane by volume is charged to the intermediate portion of the extraction tower maintained at a temperature of about 180° F. Triethanol amine is introduced to the upper portion of the tower in proportion of about 10 to 15 volumes of solvent to 1 volume of hydrocarbon feed. Extract phase is continuously withdrawn from the bottom of the tower and a portion thereof, after removal of the solvent, continuously returned to the tower at a point near the point of extract withdrawal. The amount of solvent-free extract so recycled is about 2 to 5 volumes per volume of feed hydrocarbon mixture charged to the tower.

The solvent-free extract amounts to about 10 to 20% by volume of the feed hydrocarbon mixture and contains in excess of 90 to 95% butalene-2, the remaining small amount consisting of less soluble olefins and paraffins.

The raffinate phase as removed from the top of the tower will contain a relatively small amount of solvent usually not in excess of about 1 to 5% by volume. The solvent may be removed from the raffinate phase by scrubbing with water, and the resulting mixture of water and triethanol amine is then subjected to distillation to strip the water from the solvent after which the solvent may be reused.

The extract phase which comprises butylene-2 and the bulk of the solvent is subjected to fractional distillation to strip the butylene-2 from the solvent, following which the solvent may be reused in the extraction tower.

Obviously many modifications and variations of the invention as above set forth may be made without departing from the spirit and scope thereof, and therefore only such limitations should be imposed as are indicated in the appended claims.

We claim:

1. The process for separating butylene-2 from a normally gaseous hydrocarbon mixture containing it and other less soluble olefins and paraffins which comprises subjecting said hydrocarbon mixture to contact with a solvent consisting essentially of triethanol amine, at a temperature in the range of about 100-240° F. selectively dissolving butylene-2 in the triethanol amine, withdrawing said solution from undissolved olefin and paraffin hydrocarbons, and recovering dissolved butylene-2 from the triethanol amine.

2. The process for separating butylene-2 from a normally gaseous hydrocarbon mixture containing it and other less soluble olefins and paraffins which comprises subjecting said hydrocarbon mixture to contact with a solvent consisting essentially of triethanol amine at a temperature in the range about 140 to 200° F., selectively dissolving butylene-2 in the triethanol amine during said contact, withdrawing the resulting solution from undissolved olefin and paraffin hydrocarbons, and recovering dissolved butylene-2 from the triethanol amine.

3. A process for separating butylene-2 from a $C_4$ hydrocarbon mixture containing it and other less soluble olefins and paraffins which comprises subjecting said mixture to countercurrent contact with a stream of triethanol amine, effecting said contact at a temperature in the range about 140 to 200° F., forming an extract phase comprising butylene-2 dissolved in the bulk of the solvent and a raffinate phase comprising less soluble olefins and paraffins, separating said phases, and removing butylene-2 from the separated extract phase.

4. A process for separating butylene-2 from a $C_4$ hydrocarbon mixture containing it and other less soluble olefins and paraffins which comprises subjecting said mixture to countercurrent contact with a stream of solvent consisting essentially of triethanol amine, effecting said contact at a temperature in the range about 140-200° F., forming an extract phase comprising butylene-2 dissolved in the bulk of the solvent and a raffinate phase comprising less soluble olefins and paraffins, separating said phase and removing butylene-2 from the separated extract phase.

CHARLES A. COGHLAN.
KARL J. KORPI.